United States Patent [19]

Black

[11] Patent Number: 5,448,912

[45] Date of Patent: Sep. 12, 1995

[54] BOREHOLE GARVITY DENSITY MEASURING SYSTEM

[75] Inventor: Andrew J. Black, Denver, Colo.

[73] Assignee: Gas Research Institute, Chicago, Ill.

[21] Appl. No.: 236,685

[22] Filed: Apr. 29, 1994

Related U.S. Application Data

[63] Continuation of Ser. No. 997,781, Dec. 28, 1992, abandoned.

[51] Int. Cl.⁶ .............................................. G01M 1/12
[52] U.S. Cl. .................................... 73/152; 73/382 G
[58] Field of Search ............. 73/151, 152, 382, 382 G; 356/345, 358

[56] References Cited

U.S. PATENT DOCUMENTS

| | | | |
|---|---|---|---|
| 2,570,659 | 10/1951 | Fay et al. | 73/382 R |
| 2,618,156 | 11/1952 | Boucher | 73/152 |
| 2,657,581 | 11/1953 | Fay et al. | 73/382 R |
| 2,930,138 | 3/1960 | La Coste | 73/382 R |
| 2,953,023 | 9/1960 | Goodell | 73/382 R |
| 3,027,767 | 4/1962 | Slack et al. | 73/382 R |
| 3,264,875 | 8/1966 | Goodell et al. | 73/382 R |
| 3,472,076 | 10/1969 | Howell et al. | 73/382 R |
| 3,995,479 | 12/1976 | Chapman, III | 73/151 |
| 4,445,371 | 5/1984 | Lautzenhiser | 73/382 R |
| 4,475,386 | 10/1984 | Fitch et al. | 73/151 |
| 4,596,139 | 6/1986 | Gournay | 73/DIG. 4 |
| 4,602,508 | 7/1986 | Fitch et al. | 73/382 G |
| 4,803,479 | 2/1989 | Graebner et al. | 367/33 |
| 4,809,545 | 3/1989 | Lyle | 73/151 |

Primary Examiner—Robert J. Warden
Assistant Examiner—Hien Tran
Attorney, Agent, or Firm—Hopkins & Thomas

[57] ABSTRACT

An apparatus and method for conducting a precise gravimetry survey downhole in an earth formation. The apparatus includes an elongated closed, hollow, cylindrical pressure vessel. The vessel is suspended from a vessel cable which is used for lowering and raising the vessel within a borehole. A stepper motor is mounted inside a top portion of the vessel, and includes control electronics which communicates with and is controlled by a surface system located on the surface. The stepper motor is geared to drive a winch with a gravity meter cable attached to a gravity meter so that the gravity meter cable may be used to precisely raise and lower the gravity meter inside and along the length of the elongated vessel. When the stepper motor is activated and rotates the winch, the gravity meter cable raises and lowers the gravity meter. The stepper motor is geared to the winch in a fashion so that one step of the motor corresponds with a displacement of the gravity meter in a range of from about 0.01 to about 0.001 inch per step. This control of the displacement of the gravity meter is much smaller than the heretofore magnitude of depth error readings, which cause significant density error calculations. A location device in the form of an optical encoder, is attached to the top of the gravity meter for monitoring the position of the gravity meter inside the vessel at the time of each gravity meter reading.

9 Claims, 2 Drawing Sheets

BOREHOLE GARVITY DENSITY MEASURING SYSTEM

This is a continuation of application Ser. No. 07/997,781, filed Dec. 28, 1992, and now abandoned.

BACKGROUND OF THE INVENTION (a) Field of the Invention

This invention relates to an apparatus for making gravimetric readings, and more particularly, but not by way of limitation, to a borehole gravity density measuring apparatus for measuring a precise distance between two or more gravity reading positions, and the method of using the same.

(b) Discussion of the Prior Art

Heretofore, gravity meters have been used to find, monitor, and delineate gas reservoirs. The density of a geologic formation can be calculated from the differences between gravity and depth measurements made at two different depth points in a formation, and low densities have been indicative of the presence of porous rock which typically denote gas reservoirs. Most commonly in the past, the depth has been measured from the surface travel of a cable, which is not always an accurate indication of the depth of a tool deep in the well. When a gravity meter is lowered on a cable for a great distance, for example, several thousand feet, the cable is prone to unpredictable degrees of stretch, which are dependent on little understood factors such as cable tension, temperature, pressure, and other downhole conditions which combine to make measurements of the gravity meter depth subject to uncertain errors. Reliable densities have been particularly difficult to obtain for thin beds of less than 15 feet, and multiple passes have often been required to obtain accurate density readings.

In U.S. Pat. No. 4,809,545 to Lyle, a gravity gradient logging tool is disclosed which is received inside a sonde. The sonde has a pair of spaced apart piezoelectric transducers. Each piezoelectric transducer is loaded with a known mass and excited electrically so as to vibrate at a characteristic resonant frequency. The differences in the period of vibration of each transducer is used to determine a measure of gravity gradient along a borehole formation. While this prior art reference uses two different locations within the sonde to determine gravity, it is totally electronic in its operations, has no mechanical moving parts, will produce different signal information, has no means for taking a plurality of gravity meter readings within the sonde's pressure vessel independent of raising and lowering the sonde in the bore hole, and is intended for use while the sonde is moving, rather than stationery, within the borehole.

In U.S. Pat. No. 2,570,659 to Fay, a gravity measuring device using capacitance to measure gravity is described. The device is further directed toward a mechanism for self-levelling a condenser and controlling the temperature of a sonde. A series of related U.S. Pat. Nos. 2,657,581 to Fay et al; 2,953,023 to Goodell; and 3,264,875 to Goodell et al; disclose systems for measuring gravity force as a function of the vibration of a string in the sonde, with the second and third patents disclosing means for releasing a clamp within the system which initiates the vibration with the least amount of distortion or disturbance upon release.

In U.S. Pat. No. 2,618,156 to Boucher, a gravity and density gravimeter is described which utilizes weighted balance beams in a sonde. In U.S. Pat. No. 2,930,138 to La Coste, a mechanism for mounting and levelling a gravity meter is disclosed; and U.S. Pat. No. 3,027,767 to Slack, et al describes an electronic gravity meter which measures the velocity of a falling object in a vacuum in a sonde.

U.S. Pat. No. 4,445,371 to Lautzenhiser describes a mechanism for determining the acceleration of gravity by generating an oscillation and a natural frequency utilizing a magnetic vibrator. The natural frequency being representative of the acceleration of gravity at the location, and generating a signal correlated to oscillation in order to determine the acceleration of gravity.

Also a series of U.S. Pat. Nos. 4,475,386 Fitch et al; 4,596,139 to Gournay; and 4,602,508 Fitch et al relate to borehole gravity meters which utilize pressure transducers which are sensitive to the pressure differential of a fluid within a borehole.

None of the above references found, when taken alone, or in combination, discloses or suggests the use of a gravity meter which is movably suspended within a pressure vessel by a cable, including means, such as a stepper motor, for precisely moving the gravity meter between two positions within the vessel with appropriate electronics for controlling the operation.

SUMMARY OF THE INVENTION

It is therefore an object of the present invention to provide a means for greatly improved accuracy in the taking of borehole gravity density measurements.

A more important object of the borehole gravity density measuring apparatus of the present invention is, through the accuracy of the invention, to remove errors which have heretofore been inherent in prior art methods of obtaining the relative depths of two or more gravity meter reading locations.

Another object of the apparatus and method of the present invention for conducting a precise gravity meter survey is the ability to be able to make reliable density measurements within geological formations which are less than 15 feet thick with only one pass of the apparatus.

Still another object of the present invention is to eliminate gravity meter depth differential errors due to surface cable stretch or movement measurements, of the type which have previously occurred when a gravity meter is lowered on a cable into a borehole.

Yet another object of the present invention is to provide a borehole gravity density apparatus which works independently of the length of the cable which is used to lower and raise a the apparatus in the borehole.

The subject borehole gravity density apparatus includes an elongated closed, hollow, cylindrical pressure vessel in which gravity measuring instruments are located, and which apparatus is commonly called a sonde. The vessel is suspended from a vessel cable used for lowering and raising the vessel in a borehole. A motor, such as a stepper motor, is mounted inside a top portion of the vessel and includes control electronics which communicate with and which may be controlled by a system at the surface, such as a computer. The stepper motor is geared to and drives a winch with a cable wound thereon. One end of the cable is attached to a gravity meter. When the stepper motor is activated and rotates the winch, the cable precisely raises and lowers the gravity meter inside and along the length of the elongated closed vessel. In preferred embodiments, the stepper motor is geared to the winch in a fashion such that one step of the motor corresponds to a displacement of the gravity meter in a range of from about 0.10 inch to about 0.001 inch. This small displacement movement of the gravity meter is much smaller than the magnitude of depth errors which in the prior art caused significant depth, and therefore density errors. As further detailed below, in preferred embodiments, a location device, for example in the form of an optical encoder, is attached to the top of the gravity meter for monitoring the position of the gravity meter inside the vessel at the time of each gravity meter reading.

These and other objects of the present invention will become apparent to those skilled in the art from the following detailed description, showing the contemplated novel construction, combination, and elements as herein described, and more particularly defined by the appended claims, it being understood that changes in the precise embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments of the present invention according to the best modes presently devised for the practical application of the principles thereof, and in which.

DETAILED DESCRIPTION OF THE PREFERRED EMBODIMENT

Figure 1:
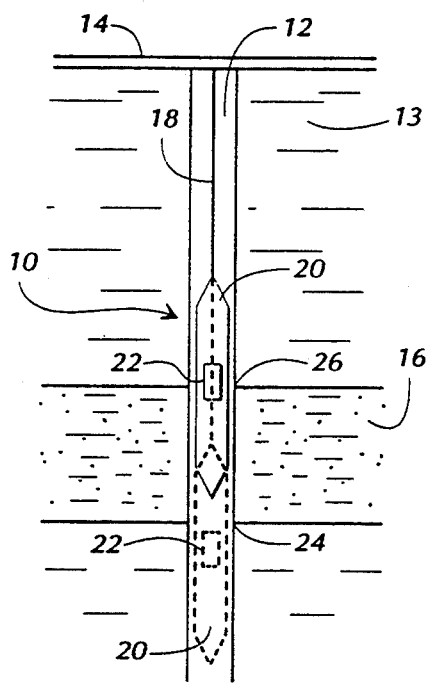
FIG. 1 is a diagrammatic illustration of a prior art sonde in a borehole, and shown in two different positions for use in taking gravimetric readings of a geological formation.

In FIG. 1 a prior art sonde, having a general reference numeral 10, is diagrammatically illustrated in a borehole 12 in a section 13 below the surface of the earth 14. In FIG. 1, the section 13 includes a geological formation 16, which is of interest as to its overall thickness and potential as to oil and gas production or mineral bearing content. The sonde 10 is attached to a vessel cable 18 which is used to raise and to lower pressure vessel 20 within borehole 12. The sonde 10 includes pressure vessel 20 and a gravity meter 22 mounted inside the vessel 20 in a fixed position. The vessel 20 is lowered to a first position 24, illustrated in phantom, at or near the bottom of the geological formation 16 which is undergoing study. At the first position 24, a gravimetric reading is taken with the gravity meter 22. After the first reading is taken, the vessel cable 18 raises the vessel 20, now shown in solid lines, to a second position 26 at or near the top of the geological formation 16. At the second position 26, a second gravimetric reading is taken with the gravity meter 22. Because an accurate reading of the distance between the first position 24 and the second position 26 is critical in determining the density of the geological formation 16, the sonde 10 as shown in FIG. 1 measures depth differential between the two gravity reading positions 24 and 26 by measuring the amount of surface movement of the vessel cable 18, which occurs when the gravity meter 22 is raised in the borehole 12. This type of arrangement is often inadequate for obtaining accurate depth differential readings, because the vessel cable 18 is prone to different amounts of unpredictable stretch when suspending the vessel 20 thousands of feet in borehole 12. It has been found that cable stretch is dependent on factors which are very difficult to measure accurately downhole, such as cable tension, and temperature and pressure on cable 18 due to varying downhole conditions. By contrast, the subject invention, as described below, provides very accurate distance measurements between density reading locations, independent of the length of cable used in lowering and raising a sonde downhole for gravity measurements.

Figure 2:
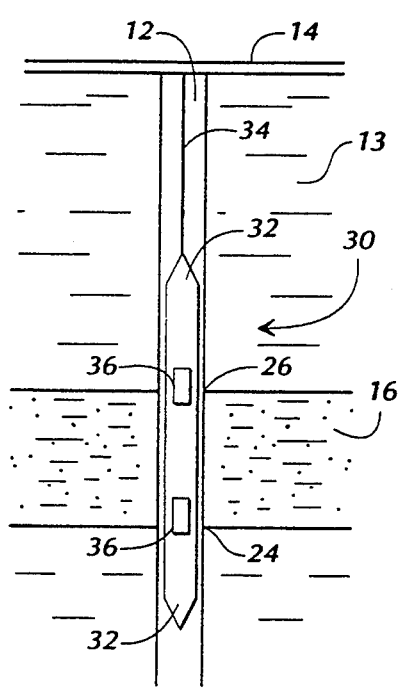
FIG. 2 is a diagrammatic illustration of the apparatus of the subject invention wherein a sonde pressure vessel is at a fixed depth in a borehole, and a gravity meter in the sonde pressure vessel is shown at a first reading position and a second reading position for taking two gravimetric readings, wherein the distance between the location of the gravity meter during each of the two readings has been precisely measured.

FIG. 2 is a diagrammatic illustration of the apparatus of the subject invention wherein a sonde having a general reference numeral 30, is at a fixed depth in a borehole 12, and a gravity meter 36 in the sonde 30 is shown at a first reading position 24 and a second reading position 26 for taking two gravimetric readings, wherein the distance between the location of the gravity meter during each of the two readings can be precisely measured. Sonde 30, includes an elongated, cylindrical, hollow, pressure vessel 32 suspended from a vessel cable 34 in the borehole 12. Inside the vessel 32 is a gravity meter 36, which is suspended from a gravity meter cable 52, as more clearly illustrated in FIGS. 3 and 4. In FIG. 2, the gravity meter 36 is shown in a first position 24 adjacent the bottom of the geological formation of interest 16, and in a raised, second position 26 adjacent the top the geological formation of interest 16. As detailed below, the distance between positions 24 and 26 in the present invention can be measured with precision and accuracy.

To measure density in the borehole 12 with the gravity meter 36, two gravity measurements, G1 and G2 are made at two different depths. The depths, for example, first position 24 and second position 26, are represented by Z1 and Z2. The density of the formation is designated by "p", and is related to the vertical gradient of gravity by the following formula:

$$p = 3.6827 - 39.13(G1 - G2)/(Z1 - Z2)$$

Errors in the estimation of "p" can arise from errors in the measurements of the gravity and depth differentials. Since it is the differential depth which is used in the above equation to obtain "p", the device and method of the present invention, which measure the depth differential, with a high degree of accuracy, effectively decreases the overall density measurement error. The subject sonde 30 provides the necessary means for moving the gravity meter 36 precisely known distances between gravity reading locations 24 and 26.

Figure 3:
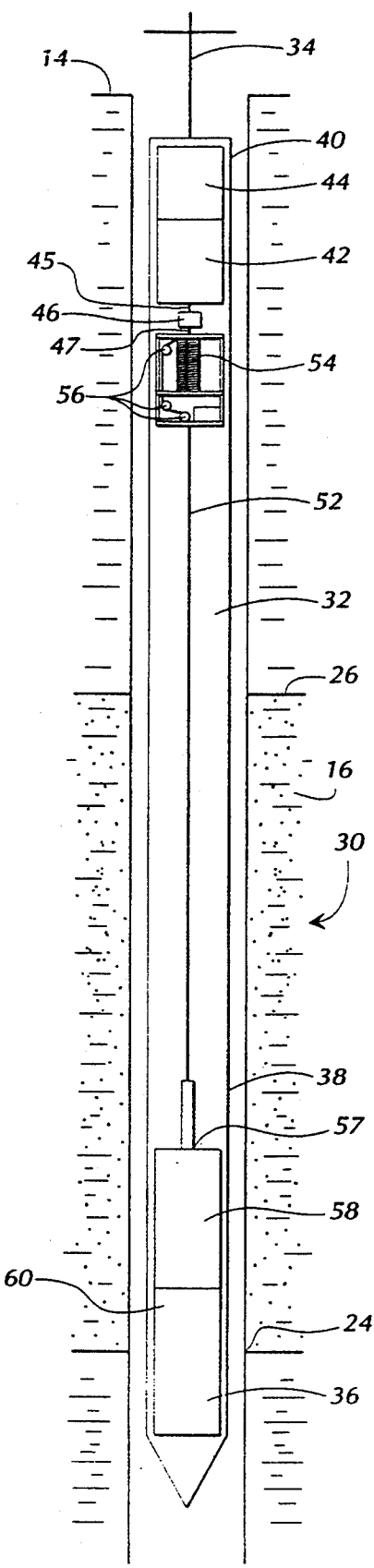
FIGS. 3 and 4 each show an enlarged diagrammatic illustration of the invention of the present invention, as shown in FIG. 2, with the gravity meter in a lowered position in FIG. 3, and a raised position in FIG. 4.

FIG. 3 shows an enlarged diagrammatic illustration of the invention of the present invention, as shown in FIG. 2, with the sonde 30 in the borehole 12, and suspended from the vessel cable 34 and gravity meter 36 in a first position 24. The pressure vessel 32 includes a vessel housing 38 having a top portion 40 with a stepper motor 42 secured therein. Mounted on top of the motor 42 are stepper motor control electronics 44, which communicates with and are controlled by a system, such as a computer, not shown, located at surface 14.

Attached to the bottom of the stepper motor 42 is a drive shaft 45 connected to a coupling 46. The coupling 46 is secured to the top of a driven shaft 47. A drive gear 48 is mounted on the driven shaft 47. The drive gear 48 engages an idle gear 49 which meshes with a pinon gear 51. The pinon gear 51 is attached to the top of a worm gear 50. The gears 48, 49, 51, and worm gear 50 are shown in greater detail in FIG. 5. As the worm gear 50 is rotated, a gravity meter cable 52 is either wound on or unwound from a rotatable winch 54 mounted just below the stepper motor 42. The winch 54 is attached to and rotated by the driven shaft 47. The cable 52 is fed onto a series of pulleys 56, attached to the housing 38. The pulleys 56 center the cable 52 inside the cylindrical hollow, elongated, pressure vessel 32. An end 57 of the cable 52 is attached to the top of an optical encoder assembly 58. The assembly 58 may include one or more optical encoders. The encoder assembly 58 is mounted on top the gravity meter 36. The encoder assembly 58 provides a means for monitoring the position of the gravity meter 36 inside the elongated pressure vessel 32.

In the operation of the sonde 30, the vessel cable 34 is used to lower the elongated vessel 32 to position adjacent the geological formation 16 as shown in FIG. 2. The stepper motor 42 is activated and the gravity meter cable 52 is used to lower the gravity meter 36 to a lower portion 60 of the vessel 32 and next to the first position 24 of the geological formation 16, as shown in FIG. 3. The gravity meter 36 now takes a first gravimetric reading of the formation 16. The computer controls are next used to activate the control electronics 44 for driving the stepper motor 42 and winding the gravity meter cable 52, which in turn raises the encoder assembly 58 and gravity meter 36 for taking a second gravimetric reading as diagrammatically illustrated in FIG. 4.

The stepper motor 42 is geared to the winch 54, as described above, so that one step of the motor corresponds to a displacement of the gravity meter 36 in an order of 10 to the minus 4 feet. This can be selected to be from about 0.01 inch to 0.001 inch of displacement per motor step. The measurement of gravity meter displacement of the meter 36 inside the housing 38 is much smaller than the magnitude of depth errors, which heretofore where the norm when making density measurements using the above equation with sondes, such as the sonde 10 shown in FIG. 1.

Figure 4:
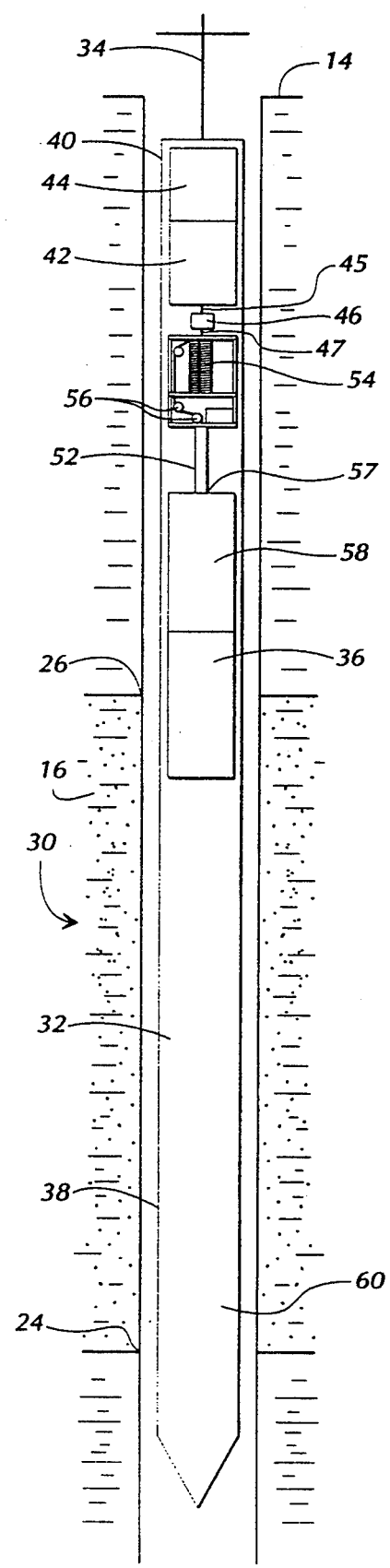

As diagrammatically illustrated in FIG. 4, after the stepper motor 42 has been activated by the control electronics 44, and the winch 54 has been rotated, rewinding played-out the gravity meter cable 52. The gravity meter cable 52 raises the gravity meter 36 to a position near the top portion 40 of the housing 38 and adjacent the second position 26 of the geological formation 16. The gravity meter 36 now takes a second gravimetric reading. Using the optical encoder assembly 58, the distance between the first gravimetric reading and second gravimetric reading is precisely known so that the calculation of $Z1-Z2$ in determining the density "p" of the formation 16 is very accurate. Also, using control electronics 44, when the stepper motor 42 is activated, the number of steps in raising or lowering the gravity meter 36 can be counted and used as another method of determining the precise distance between the two gravimetric readings.

While the above discussion of the drawings describes the gravity meter 36 used in taking two gravimetric readings, it should be appreciated that more than two readings can be taken, if necessary, to better define the density "p" of the formation 16. Also under FIGS. 3 and 4, the gravity meter 36 is described taking a first gravimetric reading in a lowered position in the vessel 32 and than raised to take a second reading. The sonde 30 is certainly adaptable to take readings, with the gravity meter 36 taking the first reading in a raised position, and than lower in the vessel 32 for taking a second reading. Further, through the electronic controls 44, the stepper motor 42 or any other type of drive motor adapted for precise movement in raising and lowering the gravity meter 32 can be used for adjusting the gravity meter 32 for minor adjustment prior to taking a gravimetric reading at the first position 24, second position 26, or any other position within the length of the vessel housing 38.

As shown in the drawings, the vessel 32 is of sufficient length so that the gravity meter 36 can travel a significant distance inside the housing 38 and along the axis thereof. The pressure vessel 32 may be constructed of a non magnetic material such as beryllium copper, titanium, or stainless steel to avoid subjecting the gravity meter 36 to varying magnetic fields along the length of the housing 38. To achieve a sufficient amount of travel of the gravity meter 36 in the housing 38, the housing 38 may be made of either a single elongated section, or two or more shorter sections connected end to end. Also it should be mentioned, that while the sonde 30 is shown in the drawings disposed in a vertical mode, the sonde 30 is able to operate effectively at an angle from the vertical, when a borehole is subject to slat or directional drilling.

Figure 5:
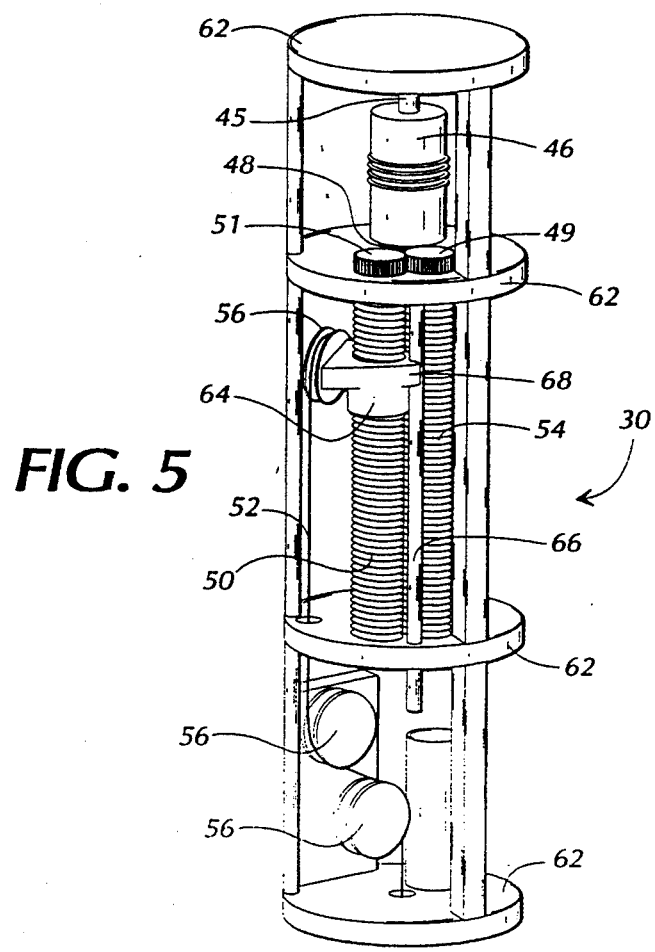
FIG. 5 illustrates a further enlarged isometric view of the upper portion of the pressure vessel of FIGS. 2, 3 and 4 with a vessel housing removed to expose the details of a winch with a cable and pulley system for precisely raising and lowering a gravity meter.

FIG. 5 illustrates a further enlarged isometric view of the upper portion 40 of the pressure vessel of FIGS. 2, 3 and 4 with a vessel housing 38 cut away to expose the details of coupling 46 and winch 54, and the cable and pulley system for raising and lower the gravity meter 36. In this view a plurality of housing spacers 62 are shown for securing the winch 54 thereto. Also shown, is a pair of the pulleys 56 mounted on a spacer 62 and disposed below the winch 54 for centering the gravity meter cable 52 inside the hollow, cylindrical vessel 32. When the stepper motor 42 is activated, the drive gear 48 turns the pinon gear 51. The pinon gear 51 turns the worm gear 50 which rotates and moves a nut inside a surrounding lead screw housing 64. The housing 64 moves up and down on the worm gear 50 and is attached to a slide bracket arm 66. One end of the slide bracket arm 66 is a slidably mounted on a vertical slide 68 attached to at opposite ends to a pair of the spacers 62. The slide 68 acts as a guide as the lead screw housing 64 moves up and down on the worm gear 50. The slide bracket arm 66, attached to the slide 68, prevents the housing 64 from turning on the worm gear 50 as housing 64 moves up and down along the length of the worm gear 50. An upper pulley 56, also attached to the housing 64, moves up and down with the housing 64 as the cable 52 is fed thereon.

It is therefore seen that the present invention provides a system for greatly improved accuracy in the taking of borehole gravity density measurements, to thereby remove errors which have heretofore been inherent in prior art methods of obtaining the relative depths of two or more gravity meter reading locations. The present invention allows a precise gravity meter survey within geological formations which are less than 15 feet thick with only one pass of the apparatus. It eliminates gravity meter depth differential errors due to surface cable movement or stretch measurements, of the type which have previously occurred when a gravity meter is lowered on a cable into a borehole, and which works independently of the length of the cable which is used to lower and raise a the apparatus in the borehole.

While the invention has been particularly shown, described and illustrated in detail with reference to the preferred embodiments and modifications thereof, it should be understood by those skilled in the art that equivalent changes in form and detail may be made therein without departing from the true spirit and scope of the invention as claimed, except as precluded by the prior art.

The embodiments of the invention for which an exclusive privilege and property right is claimed are defined as follows:

1. An apparatus for use in conducting a gravimetry survey downhole in a borehole in an earth formation, the apparatus comprising:
   an elongated, hollow vessel;
   means for measuring gravity, said gravity measuring means disposed inside said hollow vessel;
   cable means within said hollow vessel and connected to said gravity measuring means for supporting said gravity measuring means within said hollow vessel;
   means within said hollow vessel for moving said cable means known distances, and thereby moving said connected gravity measuring means said known distances within said hollow vessel;
   means for controlling and activating said moving means to move said cable means said known distances; and
   optical encoder distance measuring means disposed inside said vessel for measuring the displacement of said gravity measuring means in said hollow vessel in order to provide gravimetry survey data.

2. The apparatus as described in claim 1 wherein said vessel is an elongated, hollow, closed, cylindrical pressure vessel and including an outer surface, an inner surface, a top, and a bottom.

3. The apparatus as described in claim 1 further including means connected to said top of said pressure vessel for supporting said pressure vessel downhole in a borehole.

4. The apparatus as described in claim 1 wherein said control means is electronic and is disposed inside said vessel for activating said means for moving said supporting means and in turn moving said gravity measuring means.

5. An apparatus for conducting a gravimetry survey in a borehole in an earth formation, the apparatus comprising:
   a closed, hollow, cylindrical pressure vessel, including an outer surface, an inner surface, a top, and a bottom, said vessel dimensioned for receipt in a borehole;
   cable means connected to said top of said vessel for lowering and orienting said vessel in a borehole;
   a gravity measuring means disposed inside said hollow vessel;
   gravity meter cable means connected to said gravity measuring means for supporting said gravity measuring means within said hollow vessel;
   means for moving said gravity meter cable means known distances, and thereby moving said connected gravity measuring means said known distances within said hollow vessel;
   electronic means for controlling and activating said moving means to move said cable means said known distances; and
   optical encoder distance measuring means disposed inside said vessel for measuring the displacement of said gravity measuring means in said hollow vessel.

6. The apparatus as described in claim 5 wherein said gravity measuring means is a gravity meter used in taking gravimetric reading of an earth formation.

7. The apparatus as described in claim 5 wherein a portion of said gravity meter cable means is wound around a winch mounted inside said hollow vessel.

8. The apparatus as described in claim 5 wherein said means for moving said gravity meter cable means is a stepper motor.

9. A method for conducting a gravimetry survey of an earth formation, comprising the steps of:
   providing a closed, hollow, cylindrical pressure vessel within an earth formation, said hollow, cylindrical pressure vessel including an outer surface, an inner surface, a top, a bottom, and means on said outer surface for receiving an attachment at said top, gravity measuring means within said closed, hollow, cylindrical pressure vessel, means connected to said gravity measuring means for supporting said gravity measuring means within said, hollow, cylindrical pressure vessel, and means for moving said supporting means, and thereby moving said attached gravity measuring means within said, hollow, cylindrical pressure vessel;
   activating said gravity measuring means to measure gravity at a first position within said, hollow, cylindrical pressure vessel;
   activating said means for moving said supporting means connected to said gravity measuring means for supporting said gravity measuring means within said, hollow, cylindrical pressure vessel to move said gravity measuring means a fixed, controlled and known distance to a second position in a vertical direction within said closed, hollow, cylindrical pressure vessel when said, hollow, cylindrical pressure vessel is in a vertical orientation; and then
   activating said gravity measuring means to measure gravity at said second fixed, controlled and known position within said closed, hollow, cylindrical pressure vessel; whereby a gravimetry survey of an earth formation is conducted.

* * * * *

UNITED STATES PATENT AND TRADEMARK OFFICE
CERTIFICATE OF CORRECTION

PATENT NO. : 5,448,912
DATED : September 12, 1995
INVENTOR(S) : Andrew J. Black

It is certified that error appears in the above-indentified patent and that said Letters Patent is hereby corrected as shown below:

Title page, item [54] and column 1, line 1, in the title, delete "GARVITY" and replace with --GRAVITY--.

Signed and Sealed this

Fifth Day of December, 1995

BRUCE LEHMAN

*Attest:*

*Attesting Officer*

*Commissioner of Patents and Trademarks*